Feb. 6, 1968           V. JEZIERSKI           3,367,550
AUTOMATIC STUD SETTING APPARATUS
Filed Nov. 5, 1965           2 Sheets-Sheet 2
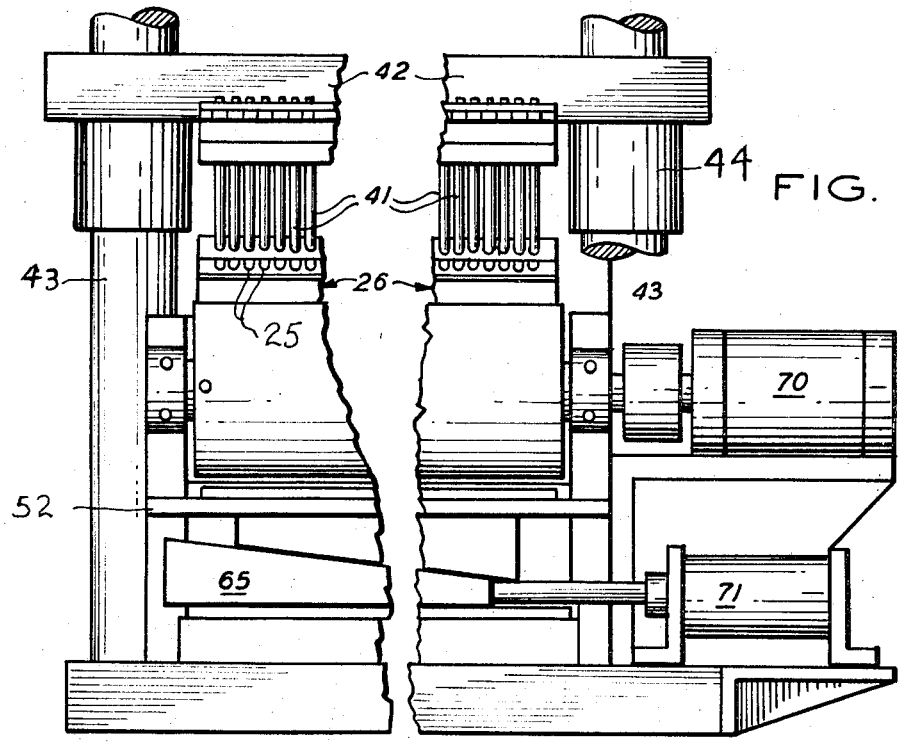
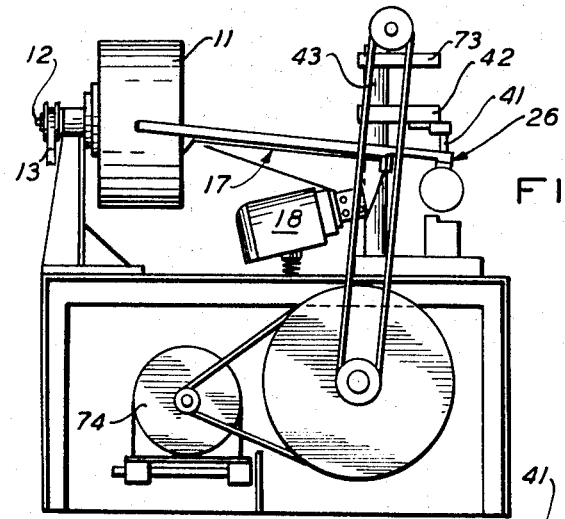
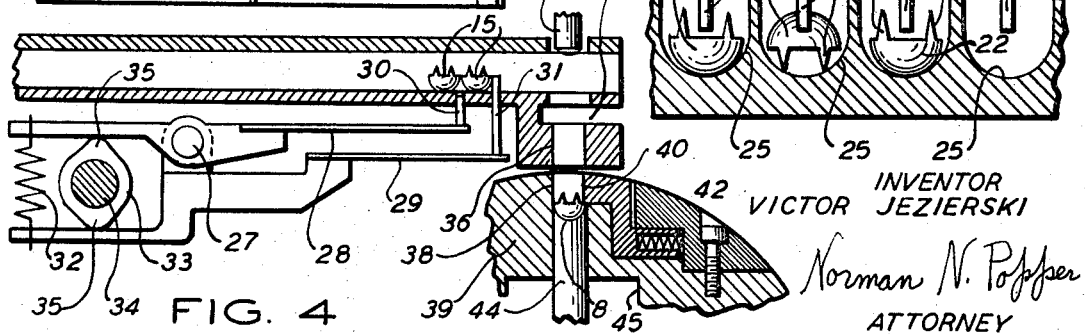
INVENTOR
VICTOR JEZIERSKI
Norman N. Popper
ATTORNEY

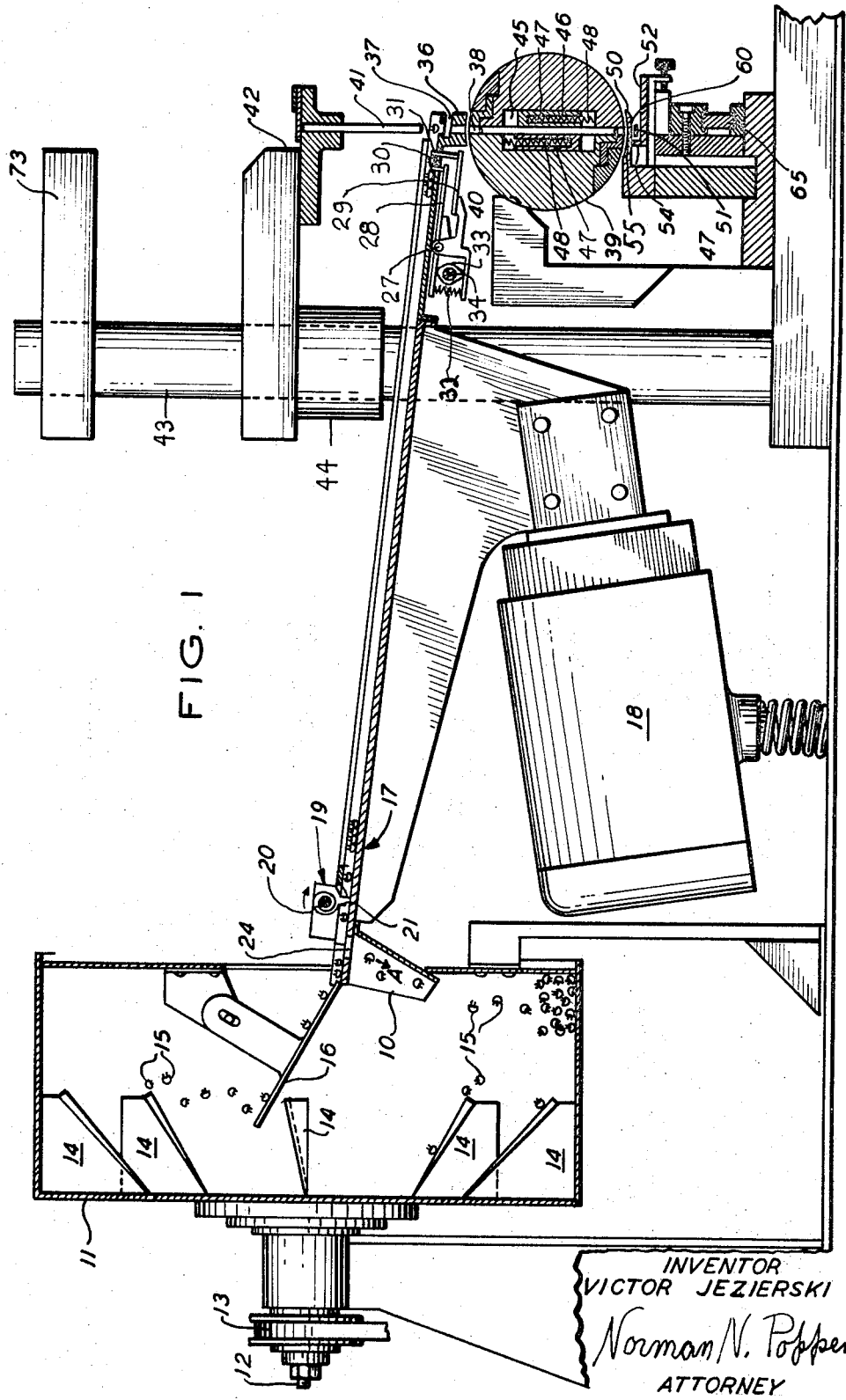

United States Patent Office 3,367,550
Patented Feb. 6, 1968

3,367,550
AUTOMATIC STUD SETTING APPARATUS
Victor Jezierski, Hackensack, N.J., assignor to American Leather Specialties Corp., New York, N.Y., a corporation of New York
Filed Nov. 5, 1965, Ser. No. 506,532
7 Claims. (Cl. 227—117)

ABSTRACT OF THE DISCLOSURE

An automatic stud setting machine in which studs are raised from a bin, deposited on a table, and agitated until they are properly oriented for delivery to a rotating die; whereupon they are passed onto tracks for delivery to a rotating die; they are held in the die as its rotates from the feed station to an affixation station; a press pin in the die is engaged by an external drive pin to drive the stud through the work piece and against an anvil to deform the lugs on the stud into clinching engagement with the work piece (a dog collar or similar article).

---

This invention relates generally to stud setting apparatus and particularly to apparatus which will simultaneously attach to a sheet or strip a large number of studs for ornamental or other purposes.

It is among the objects of the invention:
(1) To deposit studs on a chute;
(2) To deliver studs to feeding ways;
(3) To reject studs not properly oriented for feeding;
(4) To move the studs down a track to a loading station;
(5) To deliver the studs, one by one from each track to the loading bore of a rotary die;
(6) To revolve the die to point the stud toward a sheet or strip;
(7) To drive the stud into the sheet or strip and deform the spurs on the stud into clinching engagement with the sheet or strip;
(8) To perform the foregoing steps sequentially, in timed relation to each other, and automatically.

Another object of the invention is to peform the foregoing steps simultaneously on a whole series of studs without the time consuming, costly tedius manual setting of studs, one by one.

These objects and advantages, as well as other objects and advantages may be attained by the apparatus shown by way of illustration in the drawings in which:

FIGURE 1 is a partial side elevational view of the apparatus, partially sectioned;

FIGURE 2 is an end elevational view thereof;

FIGURE 3 is a side elevational view thereof with the power train;

FIGURE 4 is a vertical sectional view of the stud release mechanism and segment of the rotary die;

FIGURE 5 is a vertical sectional view of the stud tracks and detents.

Referring now to the drawings in detail, there is provided a storage bin 11, which is a generally cylindrical drum or enclosure rotated on a shaft 12. The shaft 12 is driven by a belt 13, or other suitable means connected to a motor. The drum 11 is provided with a plurality of interior pickup fins 14 on one wall. These fins 14 are angularly disposed to scoop up studs 15 deposited in the rotary storage bin 11, and carry them above the axis of rotation of the drum 11, at which point they will slide off the fins 14. Most of the studs will be deposited upon a chute 16 disposed at an angle of approximately 45° from horizontal. They will slide down the chute onto a feeding way 17. The feeding way is disposed at an angle downwardly and outwardly from the rotary storage bin, approximately 7° from horizontal. The feeding way 17 is kept in a constant vibrating condition by a vibratory mechanism 18, which is well known and is not set forth in detail. Thus, the studs 15, deposited at the entrance to the vibratory feeding way 17, are jiggled and move along the feeding way 17. An interceptor 19 is provided a short distance down the chute. This interceptor 19 is intended to reject all studs 15, which are not properly oriented for further treatment. The interceptor 19 consists of a shaft 20, which rotates at a slow rate of speed of approximately 20 revolutions per minute. The shaft has mounted thereon the spiral intercepting finger 21. This finger 21 is dimensioned either to miss or to lightly joggle studs 15 which are disposed on their dome base, with the legs 9 upwardly, but not otherwise disturb them. However, if a stud 15 is positioned with its legs 23 oriented downwardly and its dome 22 upwardly, the finger 21 will engage the dome and flip the stud 15 from the track in the direction indicated by the letter A and the arrow (FIG. 1), depositing the stud in the overflow 10. After passing the interceptor assembly 19, the studs 15 move down the feeding way 17 under the gravitational urge and the vibratory urge. They reach a plurality of concave orienting tracks 25. These tracks 25 have relatively narrow detents 23 depending from the roof of the feedway. If any misoriented studs have escaped the rotary intercepting finger 21, they now encounter orienting detents 23, which engage the dome 22 of the misoriented studs 15. The studs are then held from entering the feeding ways at their entrances until the finger 21 comes around and engages the stud, and flicks it back into the rotating storage drum 11, or flicks it into an overflow hole 24; it drops back into the rotary storage bin 11 for refeeding.

The vibratory feeding way 17 immediately beyond the overflow holes 24 are semi-circular guide-ways or channels 25 into which the properly oriented studs 15 migrate to travel toward an attachment station. The interceptor 19, and the orienting detents 23 have insured that all of the studs 15 will be riding on their domes 22 toward the attachment station. At the attaching station, the studs 15 have arrived in guide-ways precisely dimensioned to accommodate them with no portion of the stud protruding from the top of the guide way. At the attachment station 26, a pair of loading fingers 30, 31 permit delivery of the studs 15 to a rotary die. The loading fingers are mounted upon a shaft 27 which is mounted on the housing. A first support 28 is pivotally mounted on the shaft 27. A second support 29 is also pivotally mounted on the shaft 27. The first support has attached to it a loading finger 30, and the second support has attached to it a loading finger 31. A spring 32 is attached to the opposite end of the supports 28, 29 and normally pulls the supports 28, 29 together. A cam 33 is mounted upon a shaft 34, and intruded between the supports 28 and 29. The cam 33 has opposite cam enlargements 35, 35, so that as the cam rotates, the enlargements will engage both of the supports 28 and 29, and will alternately intrude the loading fingers 30 and 31, not synchronously, but successively with the load of studs 15. Thus, when the loading finger 31 drops and releases the first stud for delivery to the affixing station 26, the loading finger 30 will rise and intercept the remaining studs, so that they all will not pour into the loading station 26. With the further rotation of the cam 35, the loading finger 30 is withdrawn from intercepting relationship with the train of studs 15 and the loading finger 31 is restored to intercepting relationship, whereupon a stud is able to move past loading finger 30 to be detained by loading finger 31 ready for the next release and delivery operation.

After a stud 15 has escaped the detaining loading finger 31, it moves into loading bore 36. The top of the loading bore 36 is slightly larger than the lower part of the loading bore 36. In order to insure against the stud not being jammed at the top, an anti-jam slot 37 arranged transversally in the housing which defines the loading bore 36, intersects with the loading bore 36. This is an anti-jam slot 37, and is positioned below the entrance into the loading bore 36. This slot 37 prevents the jamming of the studs 15 at the entrance to the bore 36. The studs 15 then drop down into the lower part of the loading bore 36. It there reaches a bore 38 in the rotary die 39. It is held, however, against entry into the bore 38 in the rotary die 39 by a spring loaded detent 40. The stud 15 must now be seated in the rotary die 39, so that it may be applied to a workpiece.

This is accomplished by press pins 41 which are mounted on a plate 42, carried by a support 43. A bushing 44 slidably mounts the plate 42 on the support 43. The plate 42 is moved in a downward direction by any suitable means until the press pin 41 encounters the stud 15, held by the detent 40 at the entrance to the bore 38. The press pin 41 overcomes the spring 46 which has engaged the detent 40 with the stud, and moves the stud 15 into a domed seat 8 in the end of a drive pin 44. The drive pin 44 is slidably mounted in the bore 38. Its position is maintained symmetrical with respect to the rotary die 39 in the following manner: In the center of the die 39, there is an enlarged cavity 45. This cavity 45 accommodates a longitudinal sliding dual socket 46. This dual socket has a pair of spring bores 47 in which springs 48 are seated. These springs engage opposite sides of the cavity 45 and work in opposition to each other, tending to normalize the position of the drive pin 44, so that it extends equally on either side of the horizontal axis of the rotary die 39. The press pin 41 having driven the studs 15 to points where they are seated in the seat on the end of the drive pins 44, does not stop at this point, but proceeds to overcome one of the springs 48 (depending upon the direction in which the rotary die 39 is oriented) and press the drive pin 44 further in a downward direction. A stud 15 has been seated at the bottom of the drive pin 44, and held there by the detent 40, by reason of the action of the spring 46. This spring 46 is overcome by the drive pin 44 pressing back the detent 40, and the stud 15 is driven past the detent 40 into a bore 60 in a guide plate 50. The drive pin 44 is urged to the point where the stud 15 is at the exit end of the bore 38. At this point, a workpiece 51 is positioned as will now be indicated.

Opposite the bore 60 in the guide plate 50, a table 52 is provided. The exact positioning of this table 52 is adjustable laterally by means of the adjustment screw 53, so that the workpiece 51 can be precisely positioned with respect to the bore 60 and the stud 15 in the bore. When a workpiece 51 is positioned on the table 52 for the simultaneous application of a series of studs 15, a lip 54 and an adjustable guide 55 define a seat or channel for locating the workpiece 51 in proper position. The table 52 is elevated in timed relation to the operation of the drive pin 44 by a sliding reciprocating wedge 65. This wedge raises the table 52 until the workpiece 51 is close to the exit end of the bore 60 in the guide plate 50 whereupon the wedge 65 has a momentary dwell. This dwell occurs in timed relationship with the movement of the drive pin 44, so that the workpiece is in close abutment with the exit end of the bore 38, as the drive pin 44, exerting pressure on the stud 15, presses the legs 23 of the stud 15 into the workpiece 51. It is to be understood that there are a plurality of studs at various stations in the rotary die, so that as many as 24 studs are simultaneously applied to the workpiece. It is then that the drive pin is allowed to return to normal position by the springs 47, 48, for the press pins 41 have been withdrawn, and the springs 47, 48 are no longer overcome. Then, operating again in timed relationship to the withdrawal of the press pins 41, the loading fingers 30 and 31 release another plurality of studs 15 to the loading station 26, and the operation is continued on the next workpiece. Simultaneously with the withdrawal of the drive pin 44, and in timed relation thereto, the reciprocating wedge moves to permit the table 52 to fall so that it is no longer in close proximity with the guide plate 50, permitting the workpiece to be withdrawn from the table.

The power drive and controls for operating the various parts of the apparatus in timed relation to each other are no part of the invention and will only be broadly referred to. The stud storage bin 11 is rotated by a belt 13 connected to a motor (not shown). The feeding way 17 is jiggled continuously by the vibrating mechanism 18. The loading fingers are operated to release studs synchronously once with each 180° rotation of the rotary die 39. A rotary air cylinder 70, controlled by a microswitch on the press which operates a solenoid-valve, pneumatically turns the rotary die 180° each time the press pins 41 rise from the rotary die 39. In timed relation to the rotation of the rotary die 39, while it is not being turned, another microswitch on the rotary die operates a solenoid-valve to deliver air to the cylinder (not shown) which rotates the shaft 34 to operate the loading fingers 30, 31. Synchronously with the rotary die 39, a solenoid-valve connected to the die 39 operates an air cylinder 71. This cylinder 71 reciprocates a wedge 65 in timed relation to the rotary die 39, raising the table 52 with the workpiece 51 on it to receive the studs, as the rotary die 39 completes each 180° rotation, and lowering the table 52, as the next 180° rotation commences, in order to permit the withdrawal of the workpiece 51 to which studs 15 have been attached. It is therefore seen that the rising of the press 73 that operates the stroke plate 42 to send the drive pins into the rotary cylinder 39, triggers the setting up of the next loading of studs 15, the rising and falling of the table 50, and the rotation of the die 39. The motor 74, drives the press 73 in timed relation to the dwell of the rotary die 39, causing the drive pins 41 to set the studs 15 in the workpiece 51. It is noted in FIGURE 2 that there are a plurality of tracks 25, so that a whole series of studs can be set in the workpiece 51 (e.g. dog collar) by the plurality of press pins 41 actuating the numerous drive pins 40. Laborious, costly, time consuming, individual stud setting is thereby avoided, for the apparatus can be operated at very high speed. Numerous items requiring studs to be affixed thereto can be made by an apparatus of this kind. For example, dog collars which have numerous ornamental studs affixed in a row, can be rapidly made.

In addition to dog collars, drive belts with actuating studs for various mechanical apparatus can also be prepared in this same manner. The studs 15 can be affixed in any chosen number or position by simply blocking selected guide ways, so that the number and intervals between the studs can be arranged at will. Likewise, electrical contacts on belts can be applied at suitable intervals so that various apparatus may be electrically controlled by contact studs applied thereto. Ornaments may also be applied to men's belts, ladies' belts, gun belts, and gun holsters. Not only is it possible to ornament leather objects or to apply studs to flexible sheets or strips, but it is also possible to apply studs, contact members and the like to plastic strips and even to metal strips. Ornamental, protective, and wear studs can also be applied to articles of foot wear, leather western-style jackets, wood for furniture and numerous articles of wearing apparel. The apparatus may also be used for applying upholsterer's nails to leather and imitation leather coverings of furniture, or applying upholsterer's nails to fabrics used to cover furniture.

The foregoing description is merely intended to illustrate an embodiment of the invention. The component parts have been shown and described. They each may have substitutes which may perform a substantially similar function; such substitutes may be known as proper substitutes for the said components and may have actually been known or invented before the present invention; these substitutes are contemplated as being within the scope of the appended claims, although they are not specifically catalogued herein.

What is claimed:

1. An automatic stud setting machine comprising
   (a) a rotatable die;
   (b) a means to rotate the die periodically;
   (c) a drive pin in a generally diametrical passage in the die;
   (d) a spring normally centering the drive pin in the die;
   (e) a press pin positioned for entry into one end of the diametrical passage;
   (f) a means to move the press pin into the diametrical passage periodically in timed relation to the rotation of the die, to engage the drive pin, overcome the spring and move the drive pin along the diametrical passage;
   (g) an anvil opposite the other end of the diametrical passage;
   (h) means to feed studs one-at-a-time into the top of the diametrical passage comprising
      (A) a rotating bin;
      (B) pickup fins in the bins;
      (C) an angularly disposed feedway for receiving studs from the bin;
      (D) means to vibrate the feedway;
      (E) a rotating finger positioned above the feedway with sufficient clearance to miss studs oriented on their backs, and to engage studs oriented with their lugs down, and to flip the latter studs back into the bin.

2. An automatic stud setting machine comprising:
   (a) the device according to claim 1, and
   (b) the means to feed studs one-at-a-time into the diagonal passage also comprising:
      (A) a pair of pivotally mounted loading fingers at the end of the orienting track;
      (B) a spring normally urging one finger to block the end of the track against release of a stud;
      (C) a rotating cam engageable with the loading fingers to alternately withdraw one finger from the track and move the other into the track, operating in timed relation to the rotatable die, whereby studs are released one-at-a-time for delivery to the diametrical passage in the die.

3. An automatic stud setting machine comprising:
   (a) the device according to claim 1, and
   (b) a spring loaded deflectable detent at each end of the diametrical passage positioned to engage a stud in the passage against gravitational discharge as the die rotates.

4. An automatic stud setting machine comprising:
   (a) the device according to claim 1, and
   (b) means to reciprocate and raise the anvil with a workpiece thereon to opposite end of the diametrical passage periodically, in timed relation to the rotation of the die.

5. An automatic stud setting machine comprising:
   (a) the device according to claim 1, and
   (b) a generally wedge-shaped base on the anvil;
   (c) a generally wedge-shaped support for the base;
   (d) means to reciprocate the support for the base whereby the base with a work-piece thereon will rise in timed relation to the movement of the drive pin against a stud in the bottom of the diametrical passage, whereby the legs on the stud penetrate the workpiece on the anvil and are set and deformed against the anvil into clinching engagement with the workpiece; and the support will then lower the anvil to permit removal of the work-piece;

6. An automatic stud setting machine comprising
   (a) the device according to claim 1; and
   (b) the means to feed studs one-at-a-time into the diametrical passage further comprising:
      (A) a generally concave orienting track on the feedway beyond the rotating finger;
      (B) a narrow detent depending from above the track and dimensioned to pass between prongs of a stud oriented with prongs up and to intercept studs oriented with prongs down.

7. An automatic stud setting machine comprising
   (a) the device according to claim 1; and
   (b) the means to feed studs one-at-a-time into the diagonal passage also comprising:
      (A) a pair of pivotally mounted loading fingers at the end of the orienting track;
      (B) a spring normally urging one finger to block the end of the track against release of a stud;
      (C) a rotating cam engageable with the loading fingers to alternately withdraw one finger from the track and move the other into the track, operating in timed relation to the rotatable die, whereby studs are released one-at-a-time for delivery to the diametrical passage in the die.

References Cited

UNITED STATES PATENTS

| | | | |
|---|---|---|---|
| 544,528 | 8/1895 | Coleman | 227—114 X |
| 579,148 | 3/1897 | Hay | 227—115 |
| 606,596 | 6/1898 | Stirckler | 227—118 |
| 2,818,568 | 1/1958 | Turall et al. | 227—137 X |
| 2,856,606 | 10/1958 | Richards | 227—117 X |

GRANVILLE Y. CUSTER, JR., *Primary Examiner.*